United States Patent
Fukunaga et al.

(10) Patent No.: US 9,169,123 B2
(45) Date of Patent: Oct. 27, 2015

(54) METHOD FOR PRODUCING SODIUM CHROMITE

(75) Inventors: Atsushi Fukunaga, Osaka (JP); Shoichiro Sakai, Osaka (JP); Koji Nitta, Osaka (JP); Masatoshi Majima, Osaka (JP); Shinji Inazawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 257 days.

(21) Appl. No.: 13/980,640

(22) PCT Filed: Sep. 26, 2011

(86) PCT No.: PCT/JP2011/071850
§ 371 (c)(1),
(2), (4) Date: Jul. 19, 2013

(87) PCT Pub. No.: WO2012/105086
PCT Pub. Date: Aug. 9, 2012

(65) Prior Publication Data
US 2013/0295003 A1    Nov. 7, 2013

(30) Foreign Application Priority Data

Feb. 4, 2011    (JP) ................. 2011-022793

(51) Int. Cl.
- C01D 1/02 (2006.01)
- C01G 37/14 (2006.01)
- C01G 37/00 (2006.01)

(52) U.S. Cl.
CPC C01D 1/02 (2013.01); C01G 37/00 (2013.01); C01G 37/14 (2013.01); C01P 2002/72 (2013.01)

(58) Field of Classification Search
CPC .......... C01D 1/02; C01G 37/00; C01G 37/14; C01P 2002/72
USPC ...................................................... 423/596
See application file for complete search history.

(56) References Cited

U.S. PATENT DOCUMENTS 5,374,408 A    12/1994    Bruzzone et al.

FOREIGN PATENT DOCUMENTS

| JP | 05506637 A | 9/1993 |
| JP | 08295894 A | 11/1996 |

OTHER PUBLICATIONS

International Preliminary Report on Patentability for corresponding International application No. PCT/JP2011/071850 issued Aug. 6, 2013, 5 pages.
S. Komaba, et al., "Electrochemical Intercalation Activity of Layered NaCrO2 vs. LiCrO2," Electrochemistry Communications, 12 (2010), pp. 335-358.
S. Seki, et al., "Spin-Driven Ferroelectricity in Triangular Lattice Antiferromagnets ACrO2 (A=Cu, Ag, Li, or Na)," Physical Review Letters, Article Published Week Ending Aug. 8, 2008, vol. 101, No. 6 (2008), pp. 067204-1-067204-4.
International Search Report for PCT/JP2011/071850 mailing date of Dec. 20, 2011, 1 page.

*Primary Examiner* — Anthony J Zimmer
(74) *Attorney, Agent, or Firm* — Ditthavong & Steiner, P.C.

(57) ABSTRACT

According to this production method, the water content of a mixture of a chromium oxide ($Cr_2O_3$) powder and a sodium carbonate ($Na_2CO_3$) powder is brought to 1000 ppm or less, and the mixture is heated in an inert gas atmosphere at a calcination temperature (850 DEG C.) where the sodium carbonate and the chromium oxide undergo a calcination reaction. Sodium chromite is thereby obtained.

11 Claims, 6 Drawing Sheets

| | Production Method | | | | | | Composition of Products | |
|---|---|---|---|---|---|---|---|---|
| | Pre-weighing Drying Treatment | $Na_2CO_3/Cr_2O_3$ (Molar Ratio) | Compacting (1 t/cm²) | Calcination Conditions | | Washing | $NaCrO_2$ | Other Components |
| | | | | Temperature Conditions | Atmosphere | | | |
| EX1 | Atmospheric Pressure 300℃, 24h | 1.00/1.00 | ○ | A→B | Ar | − | ≥99.9% | $Cr_2O_3$: ≤0.05%<br>$Na_2CO_3$: ≤0.05% |
| EX2 | Atmospheric Pressure 300℃, 5h | 1.05/1.00 | ○ | A→B | Ar | ○ | ≥99.9% | $Cr_2O_3$: ≤0.05% |
| EX3 | Vacuum 150℃, 5h | 1.00/1.00 | ○ | A→B | Ar | − | ≥99.9% | $Cr_2O_3$: ≤0.05%<br>$Na_2CO_3$: ≤0.05% |
| EX4 | − | 1.00/1.00 | ○ | A→B | Ar | − | 95% | $Cr_2O_3$: ≤5% |
| EX5 | − | 1.05/1.00 | ○ | A→B | Ar | − | 96% | $Cr_2O_3$: ≤1%<br>$Na_2CO_3$: ≤3% |
| CE1 | − | 1.05/1.00 | ○ | B | Ar | − | 85% | $Na_2CrO_4$: ≤10%<br>CrOOH: ≤5% |
| CE2 | − | 1.05/1.00 | ○ | B | Air | − | 0% | $Na_2CrO_4$: ≤69% (Including Tetrahydrate)<br>$Cr_2O_3$: 31% |
| CE3 | Atmospheric Pressure 300℃, 24h | 1.00/1.00 | − | A→B | Ar | − | 20% | $Cr_2O_3$: 40%<br>$Na_2CO_3$: 40% |

Fig.2

| | Production Method | | | | | | Composition of Products | |
|---|---|---|---|---|---|---|---|---|
| | Pre-weighing Drying Treatment | Na₂CO₃/Cr₂O₃ (Molar Ratio) | Compacting (1t/cm²) | Calcination Conditions | | Washing | NaCrO₂ | Other Components |
| | | | | Temperature Conditions | Atmosphere | | | |
| EX1 | Atmospheric Pressure 300℃, 24h | 1.00/1.00 | ○ | A→B | Ar | – | ≥99.9% | Cr₂O₃:≤0.05% Na₂CO₃:≤0.05% |
| EX2 | Atmospheric Pressure 300℃, 5h | 1.05/1.00 | ○ | A→B | Ar | ○ | ≥99.9% | Cr₂O₃:≤0.05% |
| EX3 | Vacuum 150℃, 5h | 1.05/1.00 | ○ | A→B | Ar | – | ≥99.9% | Cr₂O₃:≤0.05% Na₂CO₃:≤0.05% |
| EX4 | – | 1.00/1.00 | ○ | A→B | Ar | – | 95% | Cr₂O₃:≤5% |
| EX5 | – | 1.05/1.00 | ○ | A→B | Ar | – | 96% | Cr₂O₃:≤1% Na₂CO₃:≤3% |
| CE1 | – | 1.05/1.00 | ○ | B | Ar | – | 85% | Na₂CrO₄:≤10% CrOOH:≤5% |
| CE2 | – | 1.05/1.00 | ○ | B | Air | – | 0% | Na₂CrO₄:≤69% (Including Tetrahydrate) Cr₂O₃:31% |
| CE3 | Atmospheric Pressure 300℃, 24h | 1.00/1.00 | – | A→B | Ar | – | 20% | Cr₂O₃:40% Na₂CO₃:40% |

METHOD FOR PRODUCING SODIUM CHROMITE

FIELD OF THE INVENTION

The present invention relates to a method for producing sodium chromite.

BACKGROUND OF THE INVENTION

Sodium chromite has a layer structure, in addition to which sodium chromite has the distinctive property of releasing and absorbing sodium ions. Sodium chromite is therefore used as a positive electrode material in secondary batteries. Moreover, as disclosed in Patent Document 1, sodium chromite is also used as a solid lubricant capable of use in high-temperature liquid sodium and in a high vacuum.

Sodium chromite is produced by, for example, the method described in Non-Patent Document 1; that is, by mixing together a sodium carbonate powder and a chromium oxide powder, then heating the resulting mixture in an inert gas atmosphere.

However, in addition to sodium chromite, the foregoing method also forms by-products such as sodium chromate ($Na_2CrO_4$) and CrOOH. Hence, there exists a need for technology that reduces the amount of such by-products.

PRIOR ART DOCUMENT

Patent Document

Patent Document 1: Japanese Patent Application Laid-open No. H8-295894

Non-Patent Document

Non-Patent Document 1: *Electrochem. Commun.*, Vol. 12 (2010)

SUMMARY OF THE INVENTION

It is therefore an object of the invention to provide a method for producing sodium chromite in a high yield.

Accordingly, in a first aspect, the invention provides a method for producing sodium chromite. This production method sets the water content of a mixture of a chromium oxide powder and a sodium carbonate powder to 1,000 ppm or less. Then, the mixture is heated in an inert gas atmosphere at a calcination temperature where the sodium carbonate and the chromium oxide undergo a calcination reaction.

Conventional methods for producing sodium chromite result in the formation of hexavalent chromium by-product. The inventor has discovered that when calcination is carried out at 850° C., water and chromium oxide or water, chromium oxide and sodium carbonate react, forming a by-product. The inventor is proposing a method for producing sodium chromite based on this finding. With this method, substantially no water is present in the mixture, thereby suppressing the formation of by-product and enabling a high yield of sodium chromite to be achieved.

The foregoing method for producing sodium chromite preferably includes also heat treatment in which a water content within the mixture is set to 1,000 ppm or less by heating the mixture in the inert gas atmosphere and at a non-reactive temperature where at least one reaction from among a reaction of water, chromium oxide and sodium carbonate and a reaction of water and chromium oxide does not arise, and, following the heat treatment, the mixture is preferably heated in the inert gas atmosphere and at the calcination temperature.

In this aspect of the invention, by heating the mixture of sodium carbonate powder and chromium oxide powder at a non-reactive temperature, water is removed from the mixture. The mixture is subsequently heated at a calcination temperature where the sodium carbonate and the chromium oxide undergo a calcination reaction. By carrying out in succession the step of removing water from the mixture and the step of calcining the mixture at a calcination temperature to form sodium chromite, water has difficulty infiltrating the mixture. As a result, the mixture of chromium oxide and sodium carbonate can be subjected to a calcination reaction in a state where the mixture is substantially free of water. Because the reaction of water and chromium oxide or the reaction of water, chromium oxide and sodium carbonate is thereby suppressed, by-product formation due to these reactions can be suppressed, thus making it possible to increase the yield of sodium chromite.

In the inventive method for producing sodium chromite, it is preferable for the non-reactive temperature to be in the range of 300 to 400° C.

The water in a hydrate of sodium carbonate can be removed by heating to at least 300° C. Moreover, in the range of 300 to 400° C., water, chromium oxide and sodium carbonate do not react; nor do water and chromium oxide react. Hence, in this invention, to remove the water present in sodium carbonate and the water in sodium carbonate hydrate, the non-reactive temperature was set to from 300 to 400° C. Because the reaction of water and chromium oxide and the reaction of water, chromium oxide and sodium carbonate are thereby suppressed, the formation of by-products can be suppressed.

In the inventive method for producing sodium chromite, it is preferable to dry the sodium carbonate prior to mixing together the sodium carbonate powder and the chromium oxide powder.

When producing sodium chromite, if the sodium carbonate powder and the chromium oxide powder are not accurately weighed, whichever substance of the sodium carbonate and the chromium oxide is present in excess will be unable to react and will remain unreacted even after calcination. Hence, it is necessary for the starting materials to be accurately weighed.

However, a characteristic of sodium carbonate is that it readily absorbs water. As a result, even when furnished as anhydrous sodium carbonate, by the time of use, the sodium carbonate will have absorbed water from the air. Therefore, when sodium carbonate is weighed in the amount required for synthesis without first being dried, the actual amount of sodium carbonate from which water has been removed (referred to below as the "actual amount") is smaller than the required amount. The result is an excess of chromium oxide with respect to the amount of sodium carbonate, with unreacted chromium oxide remaining in the product following calcination.

To address this problem, the invention dries the sodium carbonate prior to mixing of the sodium carbonate powder with the chromium oxide powder, thus enabling the sodium carbonate to be accurately weighed. As a result, the amount of chromium oxide that remains unreacted can be suppressed, making it possible to increase the yield of sodium chromite.

In the inventive method for producing sodium chromite, it is preferable to dry the sodium carbonate powder under reduced pressure and at a temperature of from 50 to 300° C.

Sodium carbonate forms a hydrate. Hence, it is preferable to remove water from the hydrate of sodium carbonate. By drying the sodium carbonate powder under the above conditions, drying can be achieved in a shorter time than drying under atmospheric pressure.

In the inventive method for producing sodium chromite, it is also preferable to dry the sodium carbonate powder under atmospheric pressure and at a temperature of from 300 to 850° C.

Heating to at least 300° C. under atmospheric pressure (1 atm) is required in order to remove water from sodium carbonate hydrate. However, sodium carbonate melts at 851° C. Accordingly, in this invention, the water present in sodium carbonate can be removed by heating sodium carbonate under atmospheric pressure at a temperature of from 300 to 850° C.

In the inventive method for producing sodium chromite, the ratio of the sodium carbonate to the chromium oxide, expressed as the molar ratio during weighing, is preferably at least 1.

Sodium carbonate absorbs water more readily than chromium oxide. Hence, even when the sodium carbonate has been accurately weighed, the amount of sodium carbonate sometimes is less than the required amount. In such cases, there is an excess of chromium oxide with respect the amount of sodium carbonate. As a result, when sodium carbonate and chromium oxide are mixed and calcined, unreacted chromium oxide remains within the product. Moreover, because chromium oxide does not dissolve in solvents such as water, it is difficult to remove from the product.

To address this problem, the required amount (molar amount) of sodium carbonate is made larger than the required amount (molar amount) of chromium oxide. Doing this enables the residual amount of chromium oxide to be lowered compared with cases in which the required amount (molar amount) of sodium carbonate is not made larger than the required amount (molar amount) of chromium oxide, thus enabling the proportion of sodium chromite within the product to be increased.

By making the required amount (molar amount) of sodium carbonate larger than the required amount (molar amount) of chromium oxide, there will also be cases in which the actual amount of sodium carbonate is larger than actual amount of chromium oxide. In such cases, unreacted sodium carbonate will remain following calcination. However, because sodium carbonate has solubility in solvents such as alcohols, by washing the product with a solvent such as an alcohol, the sodium carbonate can be removed. Therefore, even if the actual amount of sodium carbonate is larger than actual amount of chromium oxide, the proportion of sodium chromite present within the product can be increased by washing the product with a solvent such as an alcohol.

In the inventive method for producing sodium chromite, it is preferable to wash with a polar solvent the product obtained by heating the mixture at the calcination temperature.

According to this aspect of the invention, impurities remaining in the product, such as sodium carbonate that remains unreacted, can be removed by washing the product with a polar solvent. This enables the yield of sodium chromite to be increased.

In the inventive method for producing sodium chromite, the polar solvent is preferably an alcohol-type solvent.

In cases where the product obtained by the above production method has been washed with water, the sodium of the sodium chromite and protons donated by the water undergo exchange reactions. As a result, when the sodium chromite is used as the positive electrode of a battery, the discharge capacity may decrease. Because alcohols have a lower proton donating ability than water, the decrease in the properties of the sodium chromite from washing can be suppressed by washing with an alcohol.

In the inventive method for producing sodium chromite, it is preferable for the calcination temperature to be in the range of 850 to 900° C.

Sodium carbonate and sodium chromite undergo a calcination reaction in the range of 850 to 2400° C. However, at temperatures above 900° C., molten sodium carbonate flows more easily. In such a case, before it can react with the chromium oxide, the sodium carbonate runs, separating from the chromium oxide. When the sodium carbonate and chromium oxide separate, the sodium carbonate cannot take part in a calcination reaction with chromium oxide, resulting in a decrease in the yield of sodium chromite. By subjecting the sodium carbonate and chromium oxide to a calcination reaction at from 850 to 900° C., this aspect of the invention is able to keep the sodium carbonate from flowing and separating from the chromium oxide. Hence, a decline in the yield of sodium chromite can be suppressed.

In the inventive method for producing sodium chromite, it is preferable to compact the mixture under a pressure of at least 1 metric ton/cm$^2$ (indicated below as "1 t/cm$^2$") prior to heating the mixture at the calcination temperature.

When a mixture of sodium carbonate and chromium oxide is calcined, the sodium carbonate sometimes melts and runs, separating from the chromium oxide. To address this problem, in this aspect of the invention, prior to calcination of the mixture, the mixture is compacted under a pressure of at least 1 t/cm$^2$, thereby bringing the sodium carbonate powder and the chromium oxide powder into close mutual contact. As a result, before the molten sodium carbonate has a chance to liquefy and run, it reacts with chromium oxide that is present nearby. Melting and separation of the sodium carbonate from the chromium oxide is thus suppressed, making it possible to suppress a decline in the yield of sodium chromite.

BRIEF DESCRIPTION OF THE DRAWINGS

FIG. 2 is a table showing the production conditions and the compositions of product obtained in examples of the invention and in comparative examples.

DETAILED DESCRIPTION OF THE PREFERRED EMBODIMENTS

Figure 1:
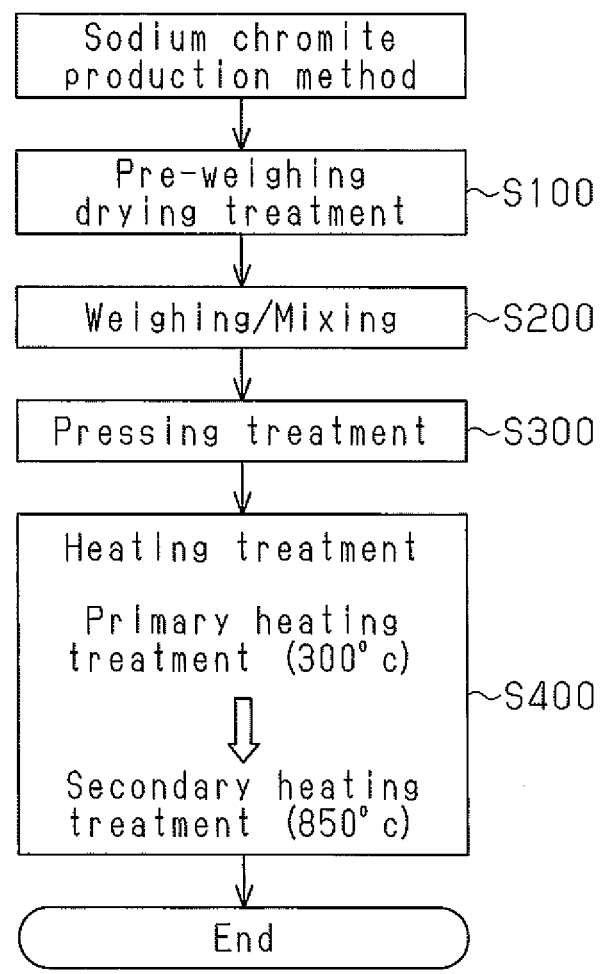
FIG. 1 is a flow chart showing the production steps in Example 1 which illustrates the inventive method for producing sodium chromite.

As shown in FIG. 1, an anhydrous powder of sodium carbonate ($Na_2CO_3$) and a chromium oxide ($Cr_2O_3$) powder are used as the starting materials forسodium chromite ($NaCrO_2$). Each of these powders has an average particle diameter of 1 to 2 μm. "Average particle diameter" refers here to the diameter at which the cumulative mass frequency in the particle size distribution becomes 50%. The particle diameter in the particle size distribution is measured using a light scattering-type particle size analyzer.

Sodium carbonate and chromium oxide react at a molar ratio of 1:1. Hence, the sodium carbonate and chromium oxide are each weighed in amounts that become equimolar at the time of the reaction. By weighing out and reacting one mole each of sodium carbonate and chromium oxide, two moles of sodium chromite is produced. Accordingly, the respective amounts of sodium carbonate and chromium oxide are set, in terms of molar ratio, to one-half the amount of sodium chromite to be produced.

Sodium carbonate has a tendency, when stored, to readily absorb water. If the sodium carbonate is weighed in a state where it has absorbed water, the actual amount of sodium carbonate decreases by the mass of the absorbed water. Hence, even though one mole each of sodium carbonate and chromium oxide have been weighed, the amount of chromium oxide is excessive relative to the sodium carbonate As a result, unreacted chromium oxide remains in the product following calcination. It is thus preferable to dry the sodium carbonate prior to weighing it.

Hence, as shown in Step S100, prior to being weighed, the sodium carbonate is heated at 300° C. for a period of 24 hours under atmospheric pressure (pre-weighing drying treatment). The heating temperature is set in the range of 300 to 850° C. The lower limit temperature of 300° C. in pre-weighing drying treatment is the temperature at which water is driven from the hydrate of sodium carbonate, forming anhydrous sodium carbonate. That is, it is difficult to remove water from the hydrate of sodium carbonate by drying at less than 300° C. The upper limit temperature of pre-weighing drying treatment is 850° C., which is a temperature lower than the melting point of sodium carbonate. Sodium carbonate melts at 851° C., and so it is necessary to carry out a pre-weighing drying treatment at a temperature lower than this melting point. The temperature of pre-weighing drying treatment is preferably from 300 to 400° C.

Next, as shown in Step S200, sodium carbonate and chromium oxide are weighed in a molar ratio of 1:1. The sodium carbonate and chromium oxide are then mixed, forming a mixture. In addition, as shown in Step S300, the mixture is charged into a heat-resistant vessel and compacted under a pressure of from 0.8 to 1.0 t/cm², and preferably 1.0 t/cm² (pressing treatment). This pressing treatment brings the sodium carbonate and chromium oxide together into close contact, facilitating reaction of the melted sodium carbonate and chromium oxide.

Next, as shown in Step S400, the mixture that has been charged into the heat-resistant vessel is loaded into an oven. The mixture of sodium carbonate and chromium oxide is then heated, under an argon atmosphere, at a temperature which is lower than the calcination starting temperature and is a non-reactive temperature (primary heating treatment (heating treatment)). The calcination starting temperature is the temperature at which the reaction of sodium carbonate with chromium oxide begins.

The non-reactive temperature is from 300 to 400° C. The lower-limit temperature of 300° C. for primary heating treatment is the temperature at which water can be removed from the hydrate of sodium carbonate. The upper limit temperature of 400° C. for primary heating treatment is the upper limit temperature at which water and chromium oxide do not react and is also the upper limit temperature at which water, chromium oxide and sodium carbonate do not react. That is, at 400° C. or higher, either sodium carbonate, chromium oxide and water react, or chromium oxide and water react, forming a hexavalent chromium compound (e.g., $Na_2CrO_4$) and CrOOH.

Primary heating treatment is carried out in order to remove water that was not removed in pre-weighing drying treatment and water absorbed by the sodium carbonate or chromium oxide following pre-weighing drying treatment. Specifically, in primary heating treatment, the mixture is heated at 300° C., as a result of which the water content required in this step, i.e., a water content of 1,000 ppm or less, is attained. The water content in this step is a value measured by the Karl Fischer method.

After primary heating treatment, the oven temperature is further increased. Then, a mixture of sodium carbonate and chromium oxide is heated at the calcination temperature (secondary heating treatment). Specifically, secondary heating treatment is carried out at 850° C.

The temperature of secondary heating treatment is set in the range of 850 to 2,400° C. The lower limit temperature of 850° C. for secondary heating treatment is the lower limit temperature at which sodium carbonate and chromium oxide stably undergo a calcination reaction. The upper limit temperature of 2,400° C. for secondary heating treatment is a value lower than the melting point of chromium oxide. The temperature of secondary heating treatment is preferably set to from 850 to 900° C. If the oven temperature is set to at least 900° C., the sodium carbonate melts and flows. Hence, before it has a chance to react with the chromium oxide, the sodium carbonate will run, resulting in separation of the chromium oxide and the sodium carbonate. When this happens, the amounts of unreacted chromium oxide and unreacted sodium carbonate increase, resulting in a decline in the yield of sodium chromite.

At the completion of secondary heating treatment, the product formed by the reaction of chromium oxide with sodium carbonate is a solid. Hence, after being taken out of the heat-resistant vessel, the product is ground up into a powder using a grinding mill. The product is typically ground to a given particle diameter according to the intended use. For example, when it is to be used in secondary battery electrodes, the product is ground to a particle size of from 0.1 to several tens of microns.

Next, changes in yield due to differences in the sodium chromite production conditions are described by comparing examples of the invention with comparative examples while referring to FIGS. 2 to 6. In FIG. 2, the bullet symbol (○) signifies that the operation in the column where the bullet symbol appears was carried out under the indicated conditions. For example, the bullet symbol shown for Example 2 in the "Compacting" column signifies that compacting at 1.0 t/cm² was carried out. The bullet symbol shown in the washing column signifies that washing was carried out. The indication "A→B" under temperature conditions for calcination means that, after 3 hours of heating at 300° C., the oven temperature was raised and 5 hours of heating at 850° C. was carried out. The indication "B" under temperature conditions for calcination means that 5 hours of heating at 850° C. was carried out.

FIG. 2 gives details on the production conditions for each example and also details on the product compositions. In the examples, the components were analyzed from a spectrum obtained with an x-ray diffractometer and, based on the ratios of integrated values from the spectrum corresponding to the respective components, each of the product compositions shown in FIG. 2 was determined. The unit "%" in the compositions stands for mol %, and is indicated below as simply "%." Only items illustrating characteristics of the invention are shown in the production conditions for each example.

Example 1

Example 1 shows the production conditions in the above-described sodium chromite production method.

(Production Conditions)
Prior to weighing, 24 hours of heating at 300° C. was carried out under atmospheric pressure.
After primary heating treatment, secondary heating treatment was carried out.
The water contents of the starting materials after primary heating treatment and before secondary heating treatment were measured and found to be 1,000 ppm or less.

Figure 3:
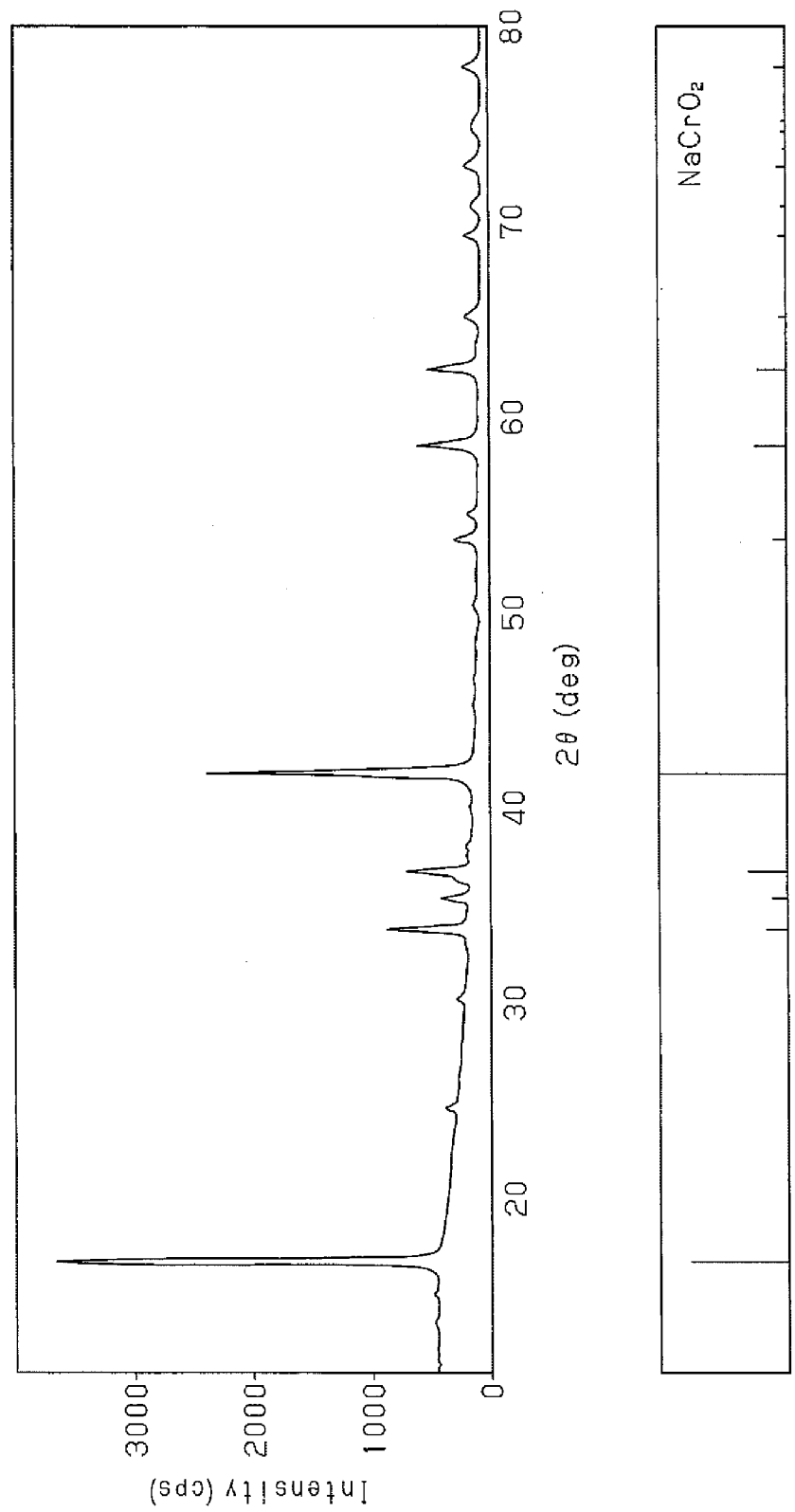
FIG. 3 is a spectrum for the product obtained under the production conditions in Example 1.

(Results)
Refer to the x-ray diffraction spectrum in FIG. 3.
The proportion (yield) of sodium chromite was at least 99.9%.
The proportion of chromium oxide was not more than 0.05%.
The proportion of sodium carbonate was not more than 0.05%.

(Evaluation)
As shown in FIG. 3, the x-ray diffraction spectrum of the product obtained under the production conditions in Example 1 was in substantial agreement with the x-ray diffraction spectrum for sodium chromite. Almost no other peaks were present. Hence, there was substantially no formation of by-product.

This is because, prior to being weighed, the sodium carbonate was dried over a sufficient length of time, enabling the sodium carbonate to be accurately weighed. Hence, neither the sodium carbonate nor the chromium oxide was present in excess, and so, following calcination, the product contained substantially no unreacted sodium carbonate or chromium oxide. In addition, because the mixture was dried by primary heating treatment, thus removing water prior to calcination due to secondary heating treatment, by-products which form owing to the presence of water were substantially absent in the product obtained by calcination.

Example 2

In Example 2, the pre-weighing drying time was shorter than in Example 1. By shortening the drying time, it is presumed that water remains in the sodium carbonate. If water is present in the sodium carbonate, even when the sodium carbonate is precisely weighed, the actual amount of sodium carbonate will be smaller than the amount that has in fact been weighed. With this in mind, in Example 2, sodium carbonate was weighed in an amount larger than the number of moles of chromium oxide.

The amount of water present in the sodium carbonate, expressed as a molar ratio, is thought to be less than 5%. However, the amount of sodium carbonate was set to 5% more than when no water is present in the sodium carbonate, and thus set to an excess relative to the chromium oxide, thereby ensuring that unreacted chromium oxide does not remain following calcination. On the other hand, following calcination, sodium carbonate remains. The remaining sodium carbonate is thus washed away with ethanol. Sodium carbonate is soluble in, for example, water or alcohol. Hence, the sodium carbonate is easily removed by washing with water or ethanol. However, chromium oxide is not readily soluble in water, alcohol or the like, and so chromium oxide cannot be easily removed by washing with water or ethanol.

(Production Conditions)
Prior to weighing, 5 hours of heating at 300° C. was carried out under atmospheric pressure.
The mixing ratio of sodium carbonate and chromium oxide, expressed as a molar ratio, was set to 1.05:1.00.
After primary heating treatment, secondary heating treatment was carried out.
After secondary heating treatment, the product was ground up and then washed with ethanol.
The water contents of the starting materials after primary heating treatment and before secondary heating treatment were measured and found to be 1,000 ppm or less.

Figure 4:
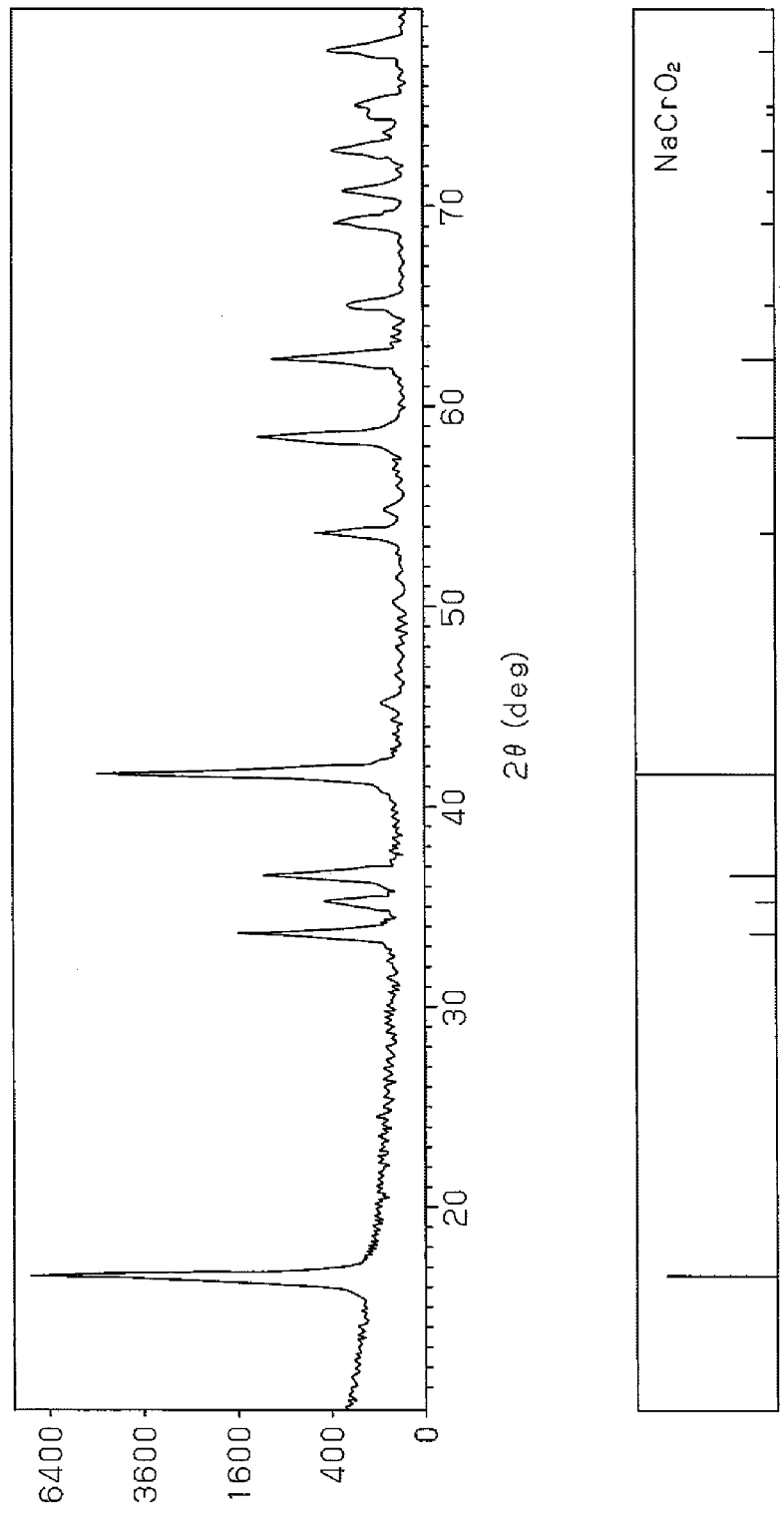
FIG. 4 is a spectrum for the product obtained under the production conditions in Example 2.

(Results)
Refer to the x-ray diffraction spectrum in FIG. 4.
The proportion (yield) of sodium chromite was at least 99.9%.
The proportion of chromium oxide was not more than 0.05%.

(Evaluation)
As shown in FIG. 4, the x-ray diffraction spectrum of the product obtained under the production conditions in Example 2 was in substantial agreement with the x-ray diffraction spectrum for sodium chromite. Almost no other peaks were present. Hence, there was substantially no formation of by-product.

When the length of drying carried out prior to weighing out the sodium carbonate is shortened, drying of the sodium carbonate may become inadequate and make it impossible to accurately weigh out the sodium carbonate. In such a case, the amount of sodium carbonate relative to chromium oxide is insufficient and may lead to the residual presence of unreacted chromium oxide, as a result of which the sodium chromite yield will presumably decrease. To address this, in Example 2, sodium carbonate was weighed in an amount that exceeded the amount of chromium oxide so that no chromium oxide would remain after calcination and, following calcination, the unreacted sodium carbonate was removed by ethanol washing. As a result, it was possible to achieve substantially the same yield of sodium chromite as in Example 1.

Example 3

In Example 3, prior to weighing, the sodium carbonate was dried by heating with a heater under reduced pressure.

(Production Conditions)
Prior to weighing, 5 hours of heating at 150° C. was carried out under reduced pressure (500 to 1,000 Pa).
After primary heating treatment, secondary heating treatment was carried out.
The water contents of the starting materials after primary heating treatment and before secondary heating treatment were measured and found to be 1,000 ppm or less.

(Results)
The proportion (yield) of sodium chromite was at least 99.9%.
The proportion of chromium oxide was not more than 0.05%.
The proportion of sodium carbonate was not more than 0.05%.

(Evaluation)
In Example 1, 24 hours of heating at 300° C. was carried out under atmospheric pressure. By contrast, in Example 3, the sodium carbonate was heated at 150° C. for 5 hours under reduced pressure. The other production conditions were the same as in Example 1. On comparing the results, the proportion of sodium chromite was found to be substantially the same in both Examples 1 and 3. That is, results similar to those in Example 1 were obtained even when the sodium carbonate was dried by heating under reduced pressure. Because water evaporates more easily under reduced pressure, the sodium carbonate can be dried in a shorter time than when it is dried under atmospheric pressure.

Example 4

In Example 4, pre-weighing drying treatment was omitted to simplify the production process.
(Production Conditions)
  Pre-weighing drying treatment was not carried out.
  After primary heating treatment, secondary heating treatment was carried out.
  The water contents of the starting materials after primary heating treatment and before secondary heating treatment were measured and found to be 1,000 ppm or less.
(Results)
  The proportion (yield) of sodium chromite was 95%.
  The proportion of chromium oxide was 5%.
(Evaluation)
  Compared with Example 1 in which pre-weighing drying treatment was carried out, there was a decrease in the proportion of sodium chromite obtained. Also, the product contained 5% of chromium oxide, but contained no sodium carbonate. From this, it is assumed that there was a surplus amount of chromium oxide relative to the amount of sodium carbonate. The reason is thought to be that, because pre-weighing drying treatment was not carried out, the sodium carbonate could not be accurately weighed.
  Compared with the subsequently described Comparative Example 1, which illustrates a production method in which primary heating treatment was not carried out prior to secondary heating treatment, by-products such as sodium chromate and CrOOH were not observed. This is likely because water present within the mixture was removed by carrying out primary heating treatment, which is a treatment for removing water, prior to secondary heating treatment.

Example 5

In Example 5, as in Example 4, pre-weighing drying treatment was omitted. In such a case, sodium carbonate contains water and so may be impossible to weigh out accurately. Because the amount of sodium carbonate with respect to the chromium oxide is insufficient, some unreacted chromium oxide may remain. As a result, it is conceivable that the yield of sodium chromite will decrease. Taking this into account, in Example 5, sodium carbonate was weighed in an amount greater than the number of moles of chromium oxide.
(Production Conditions)
  Pre-weighing drying treatment was not carried out.
  The mixing ratio of sodium carbonate to chromium oxide, expressed as a molar ratio, was 1.05:1.00.
  After primary heating treatment, secondary heating treatment was carried out.
  The water contents of the starting materials after primary heating treatment and before secondary heating treatment were measured and found to be 1,000 ppm or less.
(Results)
  The proportion (yield) of sodium chromite was 96%.
  The proportion of chromium oxide was 1%.
  The proportion of sodium carbonate was 3%.
(Evaluation)
  The proportion of chromium oxide within the product following calcination was smaller than in Example 4. This indicates that the ratio of the actual amount of sodium carbonate to the actual amount of chromium oxide during weighing out of the starting materials was closer to 1:1 than in Example 4. This is explained below.

In Example 4, because sodium carbonate was weighed without carrying out pre-weighing drying treatment, it is assumed that there was a surplus amount of chromium oxide relative to the actual amount of sodium carbonate. By contrast, in Example 5, from the beginning, the amount of sodium carbonate was made larger than the amount of chromium oxide. That is, the degree by which the amount of chromium oxide exceeds the amount of sodium carbonate was reduced, resulting in the presence of less unreacted chromium oxide following calcination.

Comparative Example 1

Figure 5:
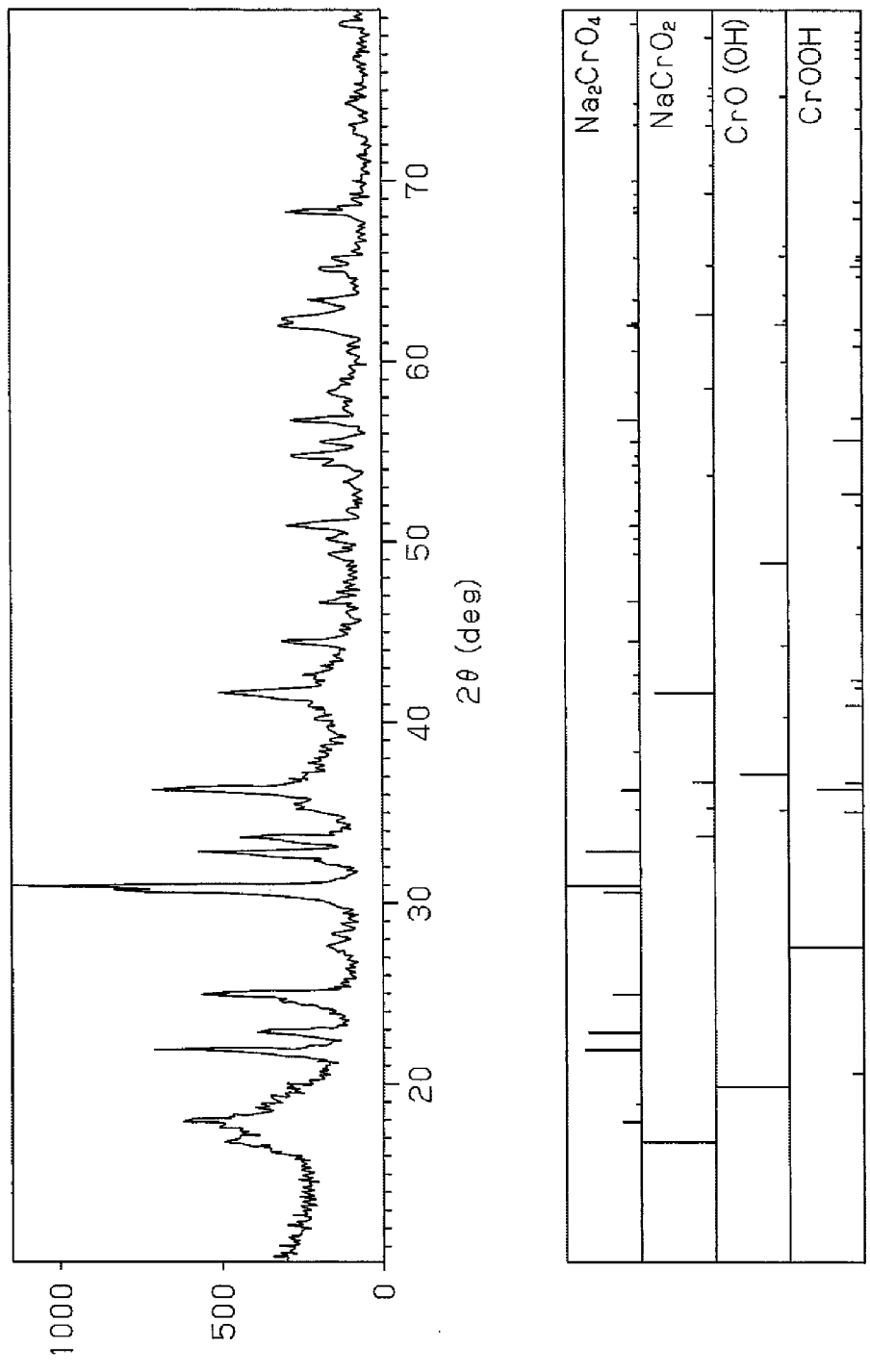
FIG. 5 is a spectrum for the product obtained under the production conditions in Comparative Example 1.

In Comparative Example 1, of the production steps in Example 1, pre-weighing drying treatment and primary heating treatment were omitted.
(Production Conditions)
  Pre-weighing drying treatment was not carried out.
  Secondary heating treatment was carried out without first carrying out primary heating treatment.
  The water contents of the starting materials after primary heating treatment and before secondary heating treatment were measured and found to be from 1 to 2%.
(Results)
  Refer to the x-ray diffraction spectrum in FIG. 5.
  The proportion (yield) of sodium chromite was 85%.
  The proportion of sodium chromate ($Na_2CrO_4$) was 10%.
  The proportion of CrOOH was 5%.
(Evaluation)
  As shown in FIG. 5, in addition to the peaks of the x-ray diffraction spectrum for sodium chromite, the x-ray diffraction spectrum of the product obtained under the conditions of Comparative Example 1 included also a number of other peaks. The other peaks were identified as belonging to sodium chromate and CrOOH.
  Also, in Comparative Example 1, the yield (proportion) of sodium chromite was low compared with Examples 1 to 5 in which primary heating treatment was carried out. The calcined product contained 10% of sodium chromate and 5% of CrOOH. Sodium chromate forms from the reaction of sodium carbonate with chromium oxide and water at temperatures 400° C. or higher. Accordingly, water is thought to have been present in the mixture when secondary heating treatment was carried out. Hence, when primary heating treatment is not carried out, by-products form, lowering the yield of sodium chromite.

Comparative Example 2

In Examples 1 to 5 and Comparative Example 1, secondary heating treatment was carried out in an argon atmosphere. In Comparative Example 2, secondary heating treatment was carried out in the open air. The other conditions were the same as in Comparative Example 1.
(Production Conditions)
  Pre-weighing drying treatment was not carried out.
  Secondary heating treatment was carried out without carrying out primary heating treatment.
  Secondary heating treatment was carried out under atmospheric pressure.
  The water contents of the starting materials after primary heating treatment and before secondary heating treatment were measured and found to be from 1 to 2%.
(Results)
  Refer to the x-ray diffraction spectrum in FIG. 6.
  The proportion of sodium chromite was 0%.

The proportion of sodium chromate (including the tetrahydrate) was 69%.

The proportion of chromium oxide was 31%.

(Evaluation)

Figure 6:
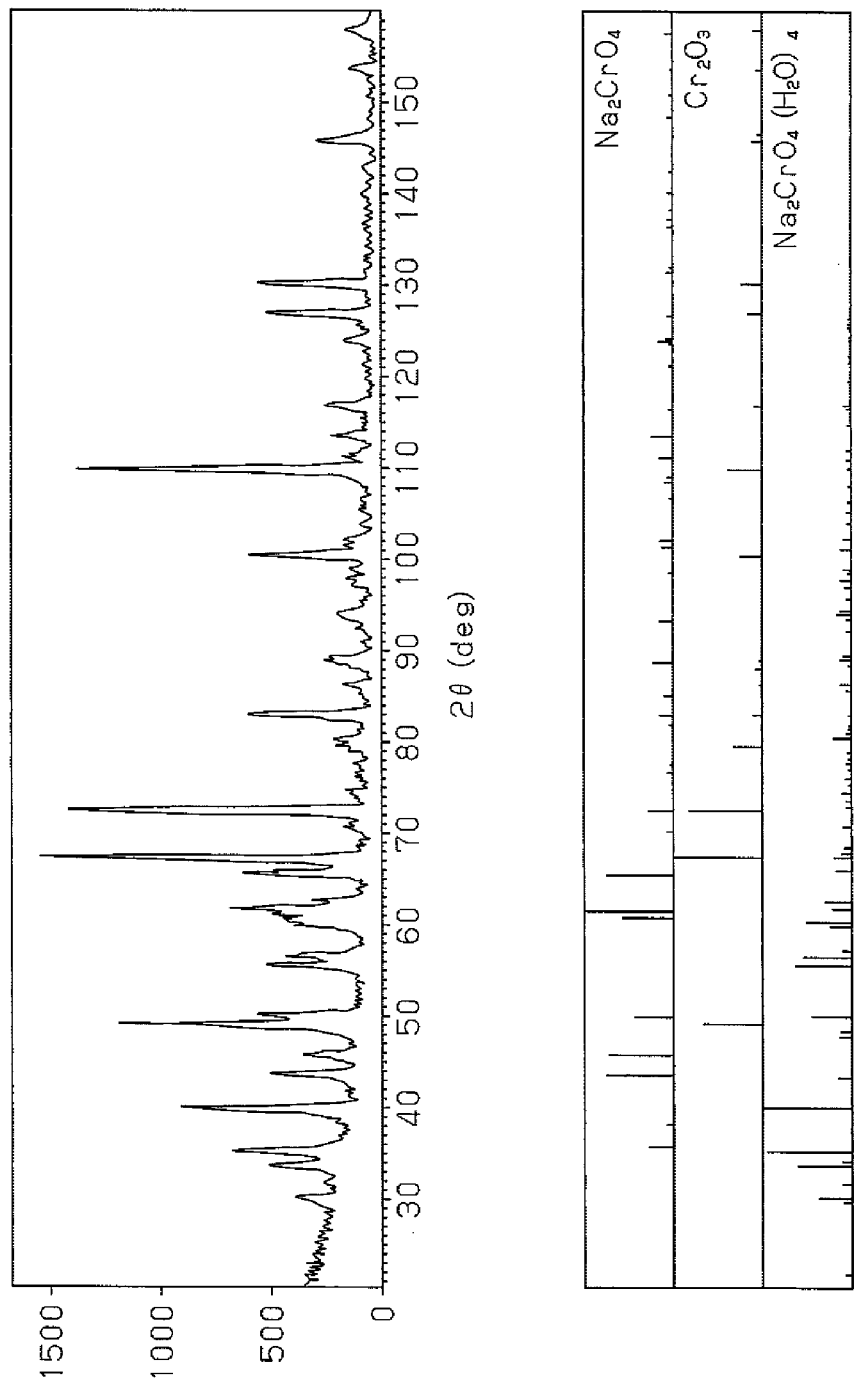
FIG. 6 is a spectrum for the product obtained under the production conditions in Comparative Example 2.

As shown in FIG. 6, based on the x-ray diffraction spectrum for the product obtained under the conditions of Comparative Example 2, the product contained sodium chromate, sodium chromate tetrahydrate and chromium oxide. Peaks corresponding to the x-ray diffraction spectrum for sodium chromite were not present.

When calcination is carried out in the open air, chromium oxidation reactions become the main reactions. As a result, sodium chromite does not form; instead, sodium chromate primarily forms. Therefore, if secondary heating treatment is not carried out in an inert gas atmosphere, sodium chromite does not form.

Comparative Example 3

In Examples 1 to 5 and Comparative Examples 1 and 2, the mixture was compacted under the application of a pressure of 1 t/cm$^2$. Such compacting was omitted in Example 3. The other conditions were the same as in Example 1.

(Production Conditions)

Compacting was not carried out.

Prior to weighing, 24 hours of heating at 300° C. was carried out under atmospheric pressure.

Following primary heating treatment, secondary heating treatment was carried out.

(Results)

The proportion of sodium chromite was 20%.

The proportion of sodium carbonate was 40%.

The proportion of chromium oxide was 40%.

(Evaluation)

When the mixture is calcined without carrying out compacting, the molten sodium carbonate runs, which leads to separation of the sodium carbonate and the chromium oxide. As a result, most of the sodium carbonate and the chromium oxide do not react and remain in an unreacted state.

The following effects can be achieved with the above embodiments of the invention.

(1) The water content of a mixture of chromium oxide powder and sodium carbonate powder was set to 1,000 ppm or less, and the mixture was heated at a calcination temperature where the chromium oxide and the sodium carbonate undergo a calcination reaction. Using this method, because substantially no water is present within the mixture, the reaction of chromium oxide, sodium carbonate and water can be suppressed under the conditions of a calcination reaction between the chromium oxide and the sodium carbonate. Hence, by-product formation can be suppressed.

(2) A chromium oxide powder and a sodium carbonate powder were mixed, and the mixture of chromium oxide powder and sodium carbonate powder was compacted. The compacted mixture was then heated at a non-reactive temperature in an argon atmosphere. After heating at a non-reactive temperature, the mixture of sodium carbonate and chromium oxide was heated at a calcination temperature where sodium carbonate and chromium oxide undergo a calcination reaction.

Under this arrangement, the mixture is heated at a non-reactive temperature so as to drive off water, after which the mixture is heated at the calcination temperature. In the resulting state where the presence of water is not allowed in the mixture, the chromium oxide and sodium carbonate undergo a calcination reaction. Because the reaction of water and chromium oxide or the reaction of water, chromium oxide and sodium carbonate is thus suppressed, it is possible to suppress the formation of by-products due to these reactions, enabling the yield of sodium chromite to be increased.

(3) Sodium carbonate has a tendency to readily absorb water. Hence, even when furnished as anhydrous sodium carbonate, by the time of use, the sodium carbonate has absorbed water from the air. Therefore, when sodium carbonate is weighed in the amount required for synthesis without first being dried, the actual amount of sodium carbonate is smaller than the required amount. The result is a surplus amount of chromium oxide with respect to the amount of sodium carbonate, with unreacted chromium oxide remaining in the product following calcination.

To address this problem, according to the invention, the sodium carbonate is dried prior to mixing of the sodium carbonate powder and the chromium oxide powder, thus enabling the amount of sodium carbonate to be accurately weighed. As a result, the amount of unreacted chromium oxide can be suppressed, making it possible to increase the yield of sodium chromite.

(4) Sodium carbonate forms a hydrate. To remove water from the hydrate of sodium carbonate, the hydrate must be heated at a temperature of at least 300° C. under atmospheric pressure. On the other hand, sodium carbonate melts at 851° C. Taking these facts into account, it is advantageous to dry the sodium carbonate powder under atmospheric pressure at a temperature of from 300 to 850° C., and preferably from 300 to 400° C. In this way, water present within the sodium carbonate can be removed.

(5) It is also possible to dry the sodium carbonate powder under reduced pressure at a temperature of from 50 to 300° C. Doing so enables the sodium carbonate powder to be dried in a shorter time than if dried under atmospheric pressure.

(6) Sodium carbonate absorbs water more readily than chromium oxide. Hence, even if the sodium carbonate is accurately weighed, the actual amount of sodium carbonate may be smaller than the required amount. In such a case, there is a surplus amount of chromium oxide with respect to the amount of sodium carbonate. As a result, when the sodium carbonate and the chromium oxide are mixed and calcined, unreacted chromium oxide remains within the product. Because chromium oxide does not dissolve in solvents such as water, it is difficult to remove from the product.

To overcome this problem, the invention makes the amount of sodium carbonate larger than the amount of chromium oxide. The mixing ratio of sodium carbonate to chromium oxide is set at the time of weighing to a molar ratio of at least 1. In this way, compared with a case in which the amount of sodium carbonate is not larger than the amount of chromium oxide, the residual amount of chromium oxide in the product obtained becomes smaller and the proportion of sodium chromite within the product can be increased.

(7) After heating the mixture at the calcination temperature, the resulting product is washed with ethanol. This enables impurities remaining in the product, such as unreacted sodium carbonate, to be removed. In this way, the yield of sodium chromite can be increased.

(8) The water in a hydrate of sodium carbonate can be removed by heating to at least 300° C. Moreover, at a temperature of from 300 to 400° C., neither the reaction of water, chromium oxide and sodium carbonate nor the reaction of water and chromium oxide arises. Hence, according to this invention, by heating to a temperature of from 300 to 400° C. in the primary heating treatment, the water present in sodium carbonate and the water in sodium carbonate hydrates can be removed. This makes it possible to more reliably suppress the reaction of water and chromium oxide and the reaction of water, chromium oxide and sodium carbonate. As a result, the formation of by-products can be suppressed.

(9) Sodium carbonate and sodium chromite can be calcined in the temperature range of 850 to 2,400° C. However, at above 900° C., molten sodium carbonate has a tendency to flow. If, in such cases, sodium carbonate runs before reacting with chromium oxide and separates from the chromium oxide, it cannot take part in the calcination reaction with chromium oxide. As a result, the yield of sodium chromite decreases. Hence, in secondary heating treatment according to this invention, by carrying out a calcination reaction in the range of 850 to 2,400° C., and preferably in the range of 850 to 900° C., sodium carbonate can be kept from flowing and separating from the chromium oxide. This enables a decrease in the yield of sodium chromite to be suppressed.

(10) When a mixture of sodium carbonate and chromium oxide is calcined, the sodium carbonate may end up melting, running from the mixture and separating from the chromium oxide. To resolve this problem, in the invention, the mixture of sodium carbonate powder and chromium oxide powder is compacted under a pressure of at least 1 t/cm$^2$, as a result of which the sodium carbonate powder and the chromium oxide powder come into closer contact within the mixture. The molten sodium carbonate is thus able to react with the chromium oxide before it becomes a liquid and runs. Because the melting of sodium carbonate and its separation from the chromium oxide can be suppressed in this way, it is possible to hold down the decline in the yield of sodium chromite.

The following modifications may be made to the embodiments described above.

In the primary heating treatment in Examples 1 to 5, the temperature was held at 300° C. for 3 hours, but the temperature may be gradually raised from 300 to 400° C. In this way, when secondary heating treatment is begun, the temperature may be raised to the calcination temperature of 850° C. in a short time.

In Examples 1 to 5, the mixture was compacted under a pressure of 1 t/cm$^2$, but the pressure applied to the mixture may be set to any value within the range of 0.8 to 5.0 t/cm$^2$. If at least 5 t/cm$^2$ of pressure is applied, grinding after calcination becomes difficult. If less than 0.8 t/cm$^2$ of pressure is applied, when the sodium carbonate melts, it becomes a liquid and may separate from the chromium oxide.

In Examples 1 to 5, the sodium carbonate and the chromium oxide were subjected to a calcination reaction in an argon atmosphere. However, provided the reaction is carried out in an inert atmosphere, another inert gas such as nitrogen may be used instead of argon.

In Example 2, the product following calcination was washed with ethanol. However, provided the sodium carbonate can be dissolved, another polar solvent such as acetonitrile may be used instead of an alcohol-type solvent.

When water is used as the washing fluid, an exchange reaction between the sodium in sodium chromite and protons takes place. As a result, properties such as the discharge capacity when sodium chromite is used as a positive electrode active material decrease. Hence, it is preferable to use a solvent having a lower proton donating ability than water as the washing fluid.

In drying of the sodium carbonate prior to weighing in Example 3, heating at 150° C. was carried out for 5 hours under a reduced pressure (500 to 1,000 Pa). The drying temperature in this case was preferably in the range of 50 to 300° C., and more preferably from 100 to 200° C.

The invention claimed is:

1. A method for producing sodium chromite, the method comprising steps of:
adjusting a water content of a mixture of a chromium oxide powder and a sodium carbonate powder to 1,000 ppm or less; and
heating the mixture in an inert gas atmosphere at a calcination temperature where the sodium carbonate and the chromium oxide undergo a calcination reaction to produce the sodium chromite.

2. The sodium chromite production method according to claim 1,
wherein the adjusting step includes heat treatment in which a water content within the mixture is adjusted to 1,000 ppm or less by heating the mixture in the inert gas atmosphere and at a non-reactive temperature where at least one reaction from among a reaction of water, chromium oxide and sodium carbonate and a reaction of water and chromium oxide does not arise, and
wherein the heating step includes heating the mixture in the inert gas atmosphere and at the calcination temperature, following the heat treatment of the adjusting step.

3. The sodium chromite production method according to claim 2, wherein the non-reactive temperature is in the range of 300 to 400° C.

4. The sodium chromite production method according to claim 1, wherein the sodium carbonate is dried prior to mixing together the sodium carbonate powder and the chromium oxide powder.

5. The sodium chromite production method according to claim 4, wherein the sodium carbonate powder is dried under reduced pressure and at a temperature of from 50 to 300° C.

6. The sodium chromite production method according to claim 4, wherein the sodium carbonate powder is dried under atmospheric pressure and at a temperature of from 300 to 850° C.

7. The sodium chromite production method according to claim 1, wherein a ratio of the sodium carbonate to the chromium oxide, expressed as the molar ratio during weighing, is at least 1.

8. The sodium chromite production method according to claim 1, the method further comprising the step of:
washing a product obtained by heating the mixture at the calcination temperature with a polar solvent.

9. The sodium chromite production method according to claim 8, wherein the polar solvent is an alcohol.

10. The sodium chromite production method according to claim 1, wherein the calcination temperature is in the range of 850 to 900° C.

11. The sodium chromite production method according to claim 1, wherein the mixture is compacted under a pressure of at least 1 t/cm$^2$ prior to heating the mixture at the calcination temperature.

* * * * *